United States Patent [19]
Szilagyi et al.

[11] Patent Number: 5,046,278
[45] Date of Patent: Sep. 10, 1991

[54] FISH CALLER

[75] Inventors: Frank Szilagyi, New Freedom; Steven W. Hayes, York, both of Pa.

[73] Assignee: York Marine Products, York, Pa.

[21] Appl. No.: 529,552

[22] Filed: May 29, 1990

[51] Int. Cl.$^5$ ............................................. A01K 79/00
[52] U.S. Cl. ...................................................... 43/17.1
[58] Field of Search ...................... 43/17.1; 340/384 E; 367/139, 142, 152

[56] References Cited

U.S. PATENT DOCUMENTS

| | | | |
|---|---|---|---|
| 2,977,705 | 4/1961 | Busnel | 43/17.1 |
| 3,058,252 | 10/1962 | Matusche | 43/17.1 |
| 3,414,873 | 12/1968 | Richard | 43/17.1 |
| 3,757,286 | 9/1973 | Richard | 340/3 |
| 3,885,338 | 5/1975 | York | 43/17.1 |
| 4,417,301 | 11/1983 | Newman | 43/17.1 |
| 4,538,249 | 8/1985 | Richard | 43/17.1 |
| 4,583,313 | 4/1986 | Dugan | 43/17.1 |
| 4,646,276 | 2/1987 | Kowalewski et al. | 367/139 |
| 4,932,007 | 6/1990 | Suomala | 43/17.1 |
| 4,955,005 | 9/1990 | Loeffelzman | 43/17.1 |

FOREIGN PATENT DOCUMENTS 0878223 11/1981 U.S.S.R. ............................... 43/17.1

OTHER PUBLICATIONS

Moulton, Swimming Sounds and the Schooling of Fishes, pp. 210-223.
Richard, Fish Attraction with Pulsed Low-Frequency Sound, pp. 1441-1452, Journal Fisheries Research Board of Canada, vol. 25, No. 7, 1968.
Blaxter, Fish Hearing, pp. 27-33.
Hashimoto & Maniwa, Research on the Luring of Fish Shoals by Utilizing Underwater Acoustical Equipment, pp. 93-104.
Iversen, Response of Yellowfin Tuna (Thunnus Albacares) to Under Water Sound, pp. 105-121.

*Primary Examiner*—Kurt Rowan
*Attorney, Agent, or Firm*—Thomas Hooker

[57] ABSTRACT

A fish caller generates an underwater signal having random high and low frequency noise components simulating sounds generated by feeding predatory fish. The signal attracts predatory fish to the caller.

15 Claims, 2 Drawing Sheets

FISH CALLER

BACKGROUND OF THE INVENTION

The invention relates to a fish caller having an underwater loudspeaker for generating an acoustic signal for attracting fish, and a method for generating the underwater signal.

Description of the Prior Art

Fishermen have long known that certain predatory fish, including sharks, have been attracted by the noises generated by propellers driving boats through the water. Additionally, it is known that fish are attracted by pulsed low frequency sound and also by fixed frequency sound transmitted underwater. Pulsed random noise signals have been broadcast underwater to attract fish.

SUMMARY OF THE INVENTION

The disclosed fish caller includes a source of pseudo-random noise and a pseudo-randomly actuated modulator operable to interrupt or turning the random noise signal on or off randomly during successive periods having durations of from 0.5 seconds to 10 seconds with the signals having durations in each period of from 0.25 seconds to 9.75 seconds. The random period and duration waveform is fed through upper and lower bandpass filters, mixed together, amplified and broadcast through an underwater speaker. The underwater sound includes random high and low frequency components and simulates the sound generated during feeding of predatory fish. This sound attracts predatory fish to the underwater speaker thereby facilitating sport and commercial fishing of the attracted and closely grouped fish. The underwater signal attracts both freshwater and saltwater predatory fish but does not attract bottom fish.

The random low frequency components of the waveform include pseudo-random noise components in the 25 to 50 Hz range and the random high frequency components include pseudo-random noise components in the 100 to 200 Hz range. The low frequency signal is particularly effective in attracting near field predatory fish excluding sharks and the high frequency range signal is particularly effective in attracting far field predatory fish including sharks.

Water transmits acoustic signals efficiently and permits the fish caller to attract fish from relatively long distances up to one or two miles. The efficiency of the caller permits a sport or commercial fisherman to locate a boat at a single central location and attract fish to the boat rather than having to move the boat over an area and attempt to locate fish within the area. The fish caller is very effective and brings predatory fish close together and very near the loudspeaker, often within sight of the fisherman. This advantage obviously increases the likelihood of successful fishing.

Other objects and features of the invention will become apparent as the description proceeds, especially when taken in conjunction with the accompanying drawings illustrating the invention, of which there are two sheets and one embodiment.

DESCRIPTION OF THE PREFERRED EMBODIMENT

Figure 1:
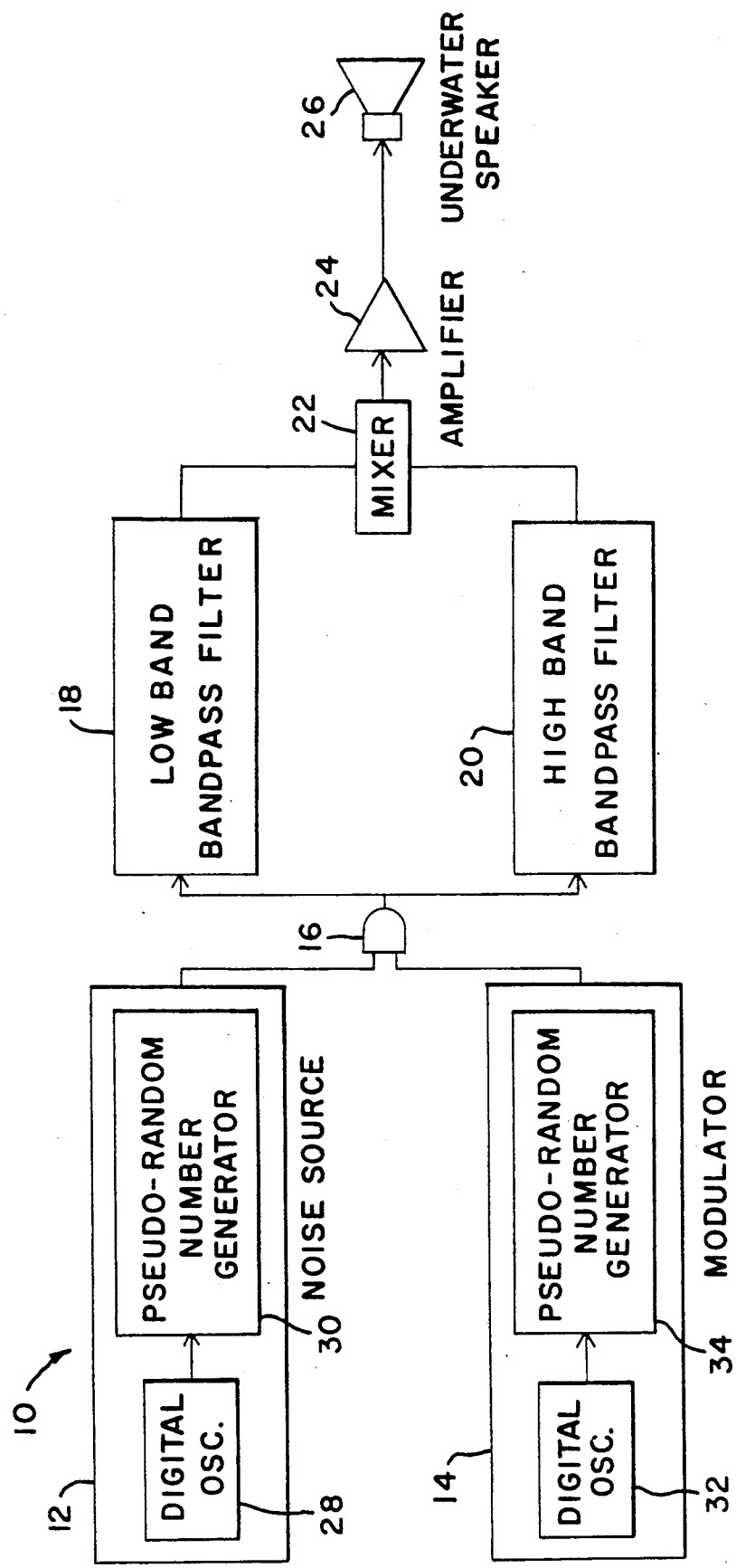
FIG. 1 is a circuit diagram of a fish caller according to the invention.

Fish caller 10 includes a noise source 12 and modulator 14 each having outputs connected to AND gate 16. The output from the AND gate is connected to the input of low band bandpass filter 18 and high band bandpass filter 20 and the filtered outputs are connected to mixer 22. The output of the mixer 22 is fed through an amplifier having an output connected to underwater speaker 26. Speaker 26 generates an irregular or random underwater acoustic signal which simulates the irregular hydrodynamic disturbances produced during active feeding of predatory fish. The signal attracts predatory fish to the speaker.

Noise source 12 includes a digital oscillator 28 which supplies a clock frequency to a pseudo-random number generator 30. The number generator may consist of a multi-stage shift register with multiple feedbacks through exclusive-or gates. The frequency of oscillator 28 is adjusted so that the output of the noise source is a digital pulse train with pseudo-randomly changing period and ON times. This train includes frequency components in at least the range of 25 Hz to 200 Hz.

Modulator 14 includes second digital oscillator 32 and second pseudo-random number generator 34, similar to the components of noise source 12 with the exception that the output of the modulator has a much lower frequency range. The modulated output has a period ranging from a minimum of 0.5 seconds to a maximum of 10 seconds and a signal during each period having a duration of from a minimum of 0.25 seconds to a maximum of 9.75 seconds.

The digital outputs from noise source 12 and modulator 14 are passed through AND gate 16. The resultant digital output is a digital random noise signal which randomly appears and disappears. The output is fed to both two bandpass filters.

Figure 2:
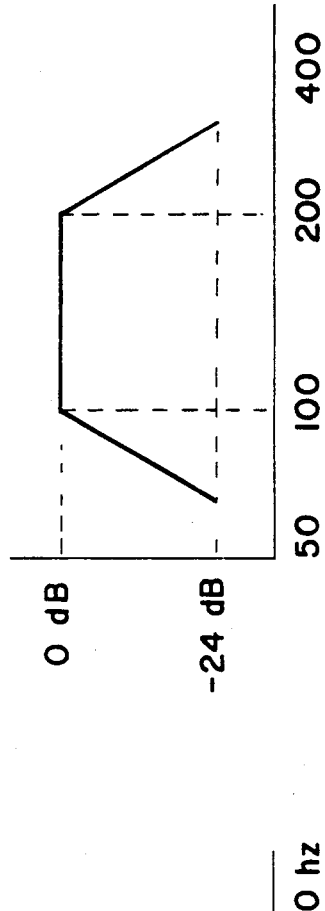
FIGS. 2 and 3 are graphs illustrating the characteristics of the low band and high bandpass filters respectively.
Figure 3:
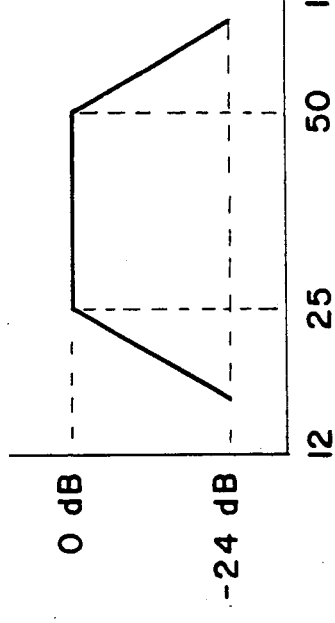

The characteristics of the low bandpass filter are shown in FIG. 2. This filter freely passes signal frequency components in the range 25 Hz to 50 Hz with shallow 24 dB per octave upper and lower roll offs. Filter 20 freely passes signal frequency components in the range 100 Hz to 200 Hz.

The outputs of filters 18 and 20 are combined by mixer 22 to form a final waveform which is fed to power amplifier 24 for amplification and transmission to underwater speaker 26.

Figure 4:
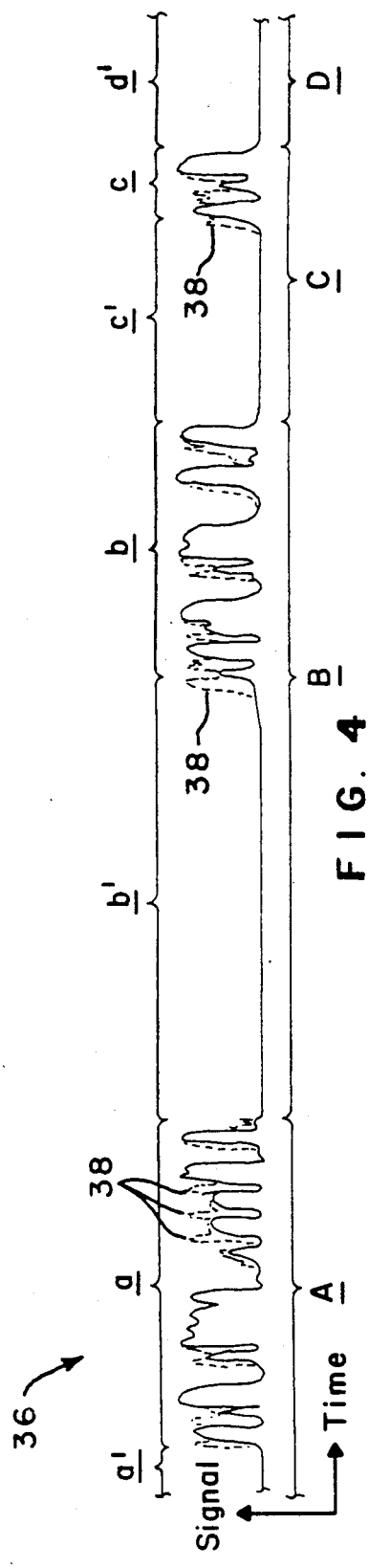
FIG. 4 is a graph of a portion of the amplified waveform generated by the fish caller of FIG. 1.

FIG. 4 shows part of a typical waveform generated by fish caller 10. The illustrated waveform includes partial random period A, complete random periods B, and C and partial random period D. Each period has a time interval of between 0.5 and 10.0 seconds and includes a noise signal a, b, c, having a duration of 0.25 to 9.75 seconds and an off time, a', b', c', of from 0.25 to 9.75 seconds.

The noise signals of waveform 36 comprise the pseudo-random frequency components passed through the two filters 18 and 20 in frequency ranges from 25 to 50 Hz and from 100 to 200 Hz. The pseudo-random nature of the noise signals is shown in solid line in FIG. 4.

The noises generated by actively feeding predatory fish are completely random. The fish caller 10 uses a pseudo-random noise source and a pseudo-random modulator to generate a signal which simulates natural irregular hydrodynamic events. The waveform, while not totally random, is sufficiently close to the natural signal to attract predatory fish to the loudspeaker 26. While it is possible to generate completely random numbers using a free electron device and it is possible to generate a completely random modulator using a similar device, these expensive and relatively cumbersome generators are needed to produce signals effectively calling predatory fish.

The high frequency and low frequency signals are effective in calling different kinds of predatory fish. The 25 to 50 Hz frequency signal is particularly effective in calling near field fish excluding sharks. The 100 to 200 Hz high frequency signal is particularly effective in calling far field fish sometimes believed located as far away as a mile or more, and sharks. The fish caller attracts salt water fish including sharks, tuna, yellow tail, black sea bass, tautog and red snapper. The caller attracts fresh water fish including minnows, large and small mouth bass, trout, sunfish and crappies.

The FIG. 4 waveform graph was taken from the output of amplifier 24. This output resulted from amplification of the pulsed digital input signal and included random high frequency overtones generated by the amplifier and represented by the dotted lines 38 in the graph. The presence or absence of overtones does not affect the efficiency of caller 10.

The graph of FIG. 4 represents but a small portion of the continuous and random waveform generated by fish caller 10 in which the signal and pause or off parts of each period very randomly in duration within each 0.5 to 10 second period and the noise signals transmitted during the signal portion of each period contain random frequencies as passed through the low band and high band filters.

The circuitry of disclosed fish caller 10 is relatively simple and inexpensive making it appropriate for use in both sport and commercial fishing. The caller may be used for both in-boat and on-shore fishing.

The output waveform 36 may be generated by other means than the disclosed fish caller 10. For instance, the pseudo-random number generator as used in noise source 12 and modulator 14 could be replaced by completely random generators. The output from the fish caller with either pseudo-random or truly random generators could be recorded on a high quality tape, computer disk or compact disk and then played back through a system having sufficient fidelity capable of accurately converting the waveform into an underwater acoustic signal. Mass market cassette tape recorders are not capable of accurately reproducing the low frequencies signals passed through the low frequency bandpass filter 18 and are inappropriate for generating the low frequency signal.

Another way to generate the disclosed waveform for calling fish is to store the frequency components in programmable Read Only Memory with an output which repeats itself during a relatively long time interval, such as five minutes, and is fed into a digital-to-analog converter to drive an output amplifier. The estimated total memory required for storage of such a signal in this medium is about 13.5 megabytes and is well within the capability of commercially available computer systems.

It is believed that the playback of the waveform fixed on a recording medium, such as magnetic tape, computer disk, compact disk or ROM can be repetitive provided that the duration of the recording is sufficient to prevent loss of the perceived random characteristics of the underwater signal.

The sounds generated by feeding predatory fish are completely random. The waveform 36 generated by fish caller 10 has a pseudo-random period and signal and a signal made up of high and low frequency pseudo-random noise. Fish are attracted by the broadcast waveform and apparently are unable to distinguish between its pseudo-random components and truly random components of the naturally occurring sound generated by feeding fish. Accordingly, for purposes of the present description and claims the term "random" is used to refer to both truly random and pseudo-random frequency components and intervals and the terms "truly random" and "pseudo-random" are used literally.

While we have illustrated understood and described a preferred embodiment of our invention, it is understood that this is capable of modification, and we therefore do not wish to be limited to the precise details set forth, but desire to avail ourselves of such changes and alterations as fall within the purview of the following claims.

What we claimed as our invention is:

1. A fish caller including:
  a. a noise source having a first digital oscillator generating a clock frequency output, and a first random number generator driven by the digital oscillator output to generate a noise source output signal consisting of random frequency components in at least the range of 25 Hz to 200 Hz;
  b. a modulator having a second digital oscillator and a second random number generator driven by the output of the second digital oscillator to generate a modulator output signal having a period randomly changing from a minimum duration of about 0.5 seconds to a maximum duration of about 10.0 seconds and a signal within each period and separate from the signal of adjacent periods, the signal having a minimum duration of from about 0.25 seconds to a maximum duration of about 9.75 seconds;
  c. a low bandpass filter having a bandpass range of from about 25 Hz to 50 Hz;
  d. a high band bypass filter having a bandpass range of from about 100 Hz to 200 Hz;
  e. an AND gate connecting outputs of the noise source and the modulator to the input of each of said filters, the gate output signal comprising a digital waveform with successive randomly changing periods and a random signal made up of frequency components;
  f. a mixer connected to the outputs of said filters for combining the two filtered random digital signals;
  g. an amplifier connected to the output of the mixer for amplifying the pulsed, filtered and mixed signal; and
  h. an underwater loudspeaker connected to the output of the amplifier for transmitting an output signal into underwater acoustic signal for attracting fish.

2. A fish caller as in claim 1 wherein the first and second random number generators are true random number generators.

3. A fish caller as in claim 1 wherein the first and second random number generators are pseudo-random number generators.

4. A fish caller including:

a. waveform generating means for generating an irregular digital waveform including a series of successive random periods each having a duration randomly varying from a minimum duration of about 0.05 seconds to a maximum duration of about 10 seconds with each period including a signal randomly varying in duration from a minimum signal duration of about 0.25 seconds to a maximum signal duration of about 9.75 seconds with the signals of each period being separate from the signals of adjacent periods and the signal of each period consisting of random frequency components in at least one continuous frequency range, and such waveform simulating underwater noise generated by the feeding of predatory fish; and b. an underwater loud speaker for broadcasting the waveform into water to attract fish.

5. A fish caller as in claim 4 wherein said waveform generating means includes a random number generator and an oscillator drive for the random number generator.

6. A fish caller as in claim 5 wherein said random number generator is a true random number generator.

7. A fish caller as in claim 5 wherein the random number generator is a pseudo-random number generator.

8. A fish caller as in claim 4 wherein said waveform generating means includes a source of random digital frequency components extending across said frequency range, a modulator for interrupting said components on an irregular basis and a filter for removing frequency components outside of the frequency range.

9. A fish caller as in claim 8 wherein said waveform generating means signal includes frequency components in at least two separate, continuous frequency ranges and such means includes a pair of series-oriented bandpass filters.

10. The method of attracting fish underwater including the steps of:

a. generating an irregular waveform including a series of successive random periods each having a duration randomly varying from a minimum duration of about 0.5 seconds to a maximum duration of about 10 seconds with each period including a signal randomly varying in duration from a minimum signal duration of about 0.25 seconds to a maximum signal duration of about 9.75 seconds and with the signal of each period being separate from the signals of adjacent periods, the signal of each period consisting of random frequency components in at least one continuous frequency range, such waveform simulating underwater noise generated by the feeding of predatory fish; and b. broadcasting the waveform underwater.

11. The method of claim 10 including the step of generating truly random duration periods, truly random duration signals and truly random frequency components.

12. The method of claim 10 including the step of generating pseudo-random duration periods, pseudo-random duration signals and pseudo-random frequency components.

13. The method of claim 10 including the steps of generating and broadcasting signals consisting of random frequency components from at least a pair of continuous and separate frequency ranges.

14. The method of claim 13 including the steps of generating and broadcasting frequency components in frequency ranges extending from 25 Hz to 50 Hz and from 100 Hz to 200 Hz.

15. The method of claim 10 including the step of repetitively broadcasting a portion of said waveform underwater, said portion including a relatively large number of periods.

* * * * *